METHOD OF FABRICATING ELECTRICAL CONNECTORS

Filed March 7, 1966 2 Sheets-Sheet 1

INVENTOR
GILBERT R. REID

BY [signature]
AGENT

METHOD OF FABRICATING ELECTRICAL CONNECTORS

Filed March 7, 1966 2 Sheets-Sheet 2

United States Patent Office 3,399,452
Patented Sept. 3, 1968

3,399,452

METHOD OF FABRICATING ELECTRICAL CONNECTORS

Gilbert R. Reid, Norristown, Pa., assignor to Sperry Rand Corporation, New York, N.Y., a corporation of Delaware Filed Mar. 7, 1966, Ser. No. 532,453
4 Claims. (Cl. 29—629)

ABSTRACT OF THE DISCLOSURE

This invention comprises the method steps of forming by etching techniques a plurality of flexible, self-supporting high quality contact elements bonded to a thin flexible substrate of electrically insulating material with the opposite ends of the contacts freely extending beyond the substrate for individual flexibility and available for connection to associated apparatus. In particular, the contacts connect to plated wire memory elements having a diameter on the order of 5 mils (the size of a human hair). The ends of the contact elements are provided with grooves which are formed simultaneously with the etching of the contact elements by leaving a four sided slot. The ends are then shaped in a bowed configuration so as to form a pressure contact for the said wire memory elements.

This invention relates to the method of fabricating electrical connectors and while not limited thereto, more particularly those electrical connectors for interconnecting high density closely arrayed electrical circuit elements.

In this day of integrated circuitry or electrical circuit miniaturization it has become increasingly difficult, as circuits become smaller and smaller and more densely packed, to effect good electrical connection thereto of circuit components, or even interconnection of circuit elements therein.

The present invention overcomes these difficulties by providing a novel method of fabricating flexible connecting devices having a broad range of contact spacing, from ultraminiature to ultra-large or random spacing. The device lends itself to be fabricated by inexpensive mass production methods without highly skilled help.

In accordance with the above, the invention comprises the steps of forming a plurality of flexible, self-supporting high quality contact elements bonded to a thin flexible substrate of electrically insulating material with the opposite ends of the contacts freely extending beyond the substrate for individual flexibility and available for connection to associated apparatus, the terminal ends of the contacts preferably being formed to facilitate such connections.

Figure 6:
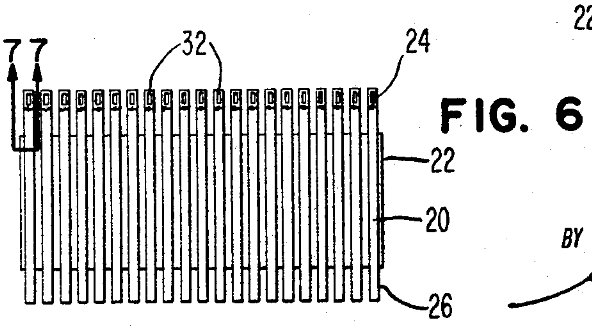
Figure 8:
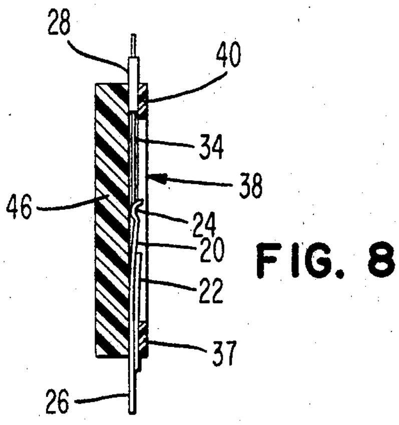
FIG. 8 is a sectional view taken along the line 8—8 of FIG. 1.

First with reference to FIG. 6 it is seen that the finished connector comprises a plurality of electrical contact elements 20 bonded to and arranged in closely spaced parallel relationship on a substrate 22 with their opposite terminal ends 24 and 26 extending beyond opposite edges of the substrate. In this form of the invention, the ends 24 are bowed, see FIG. 8, to facilitate connection to the associated apparatus 28 such as a plated wire memory plane of the type described in applicant's copending application Ser. No. 426,050, filed Jan. 18, 1965, and assigned to the same assignee as the present invention.

Figure 7:
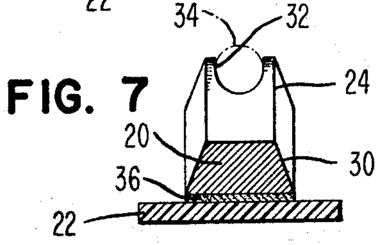
FIG. 7 is an enlarged sectional view of one connector element fabricated in accordance with the method of the invention taken along the line 7—7 of FIG. 4.

In the preferred form, the contacts are formed of beryllium-copper .006" thick, and of any desired width. As seen in FIG. 7 the sides 30 slope outwardly from the top of the contact, downwardly to a wider base. Each end 24 is provided with a shallow groove 32 at the top of its bow to facilitate alignment with and connection to the wires 34 of the memory device 28. The contacts are bonded to a .002" thick electrically insulating flexible substrate 22 of Du Pont's Mylar polyester film by a .001" coating of polyester adhesive 36, such as Du Pont's "46971 Adhesive."

Figure 1:
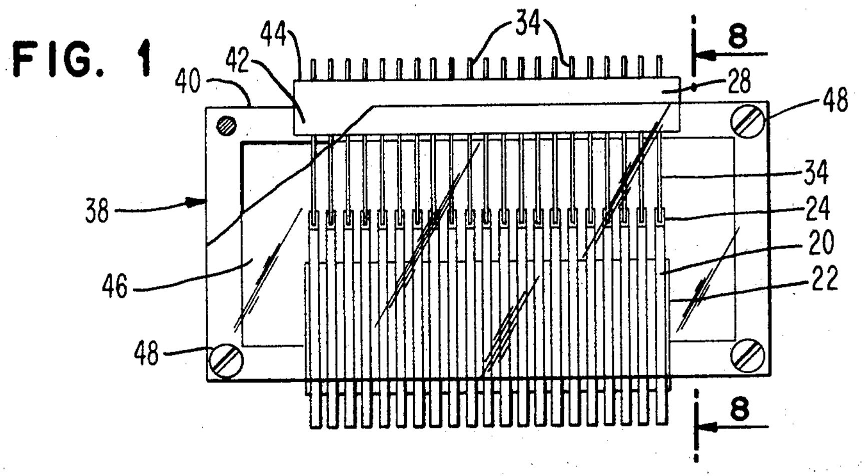
FIG. 1 is a plan view of apparatus embodying a connector fabricated in accordance with the present invention.
Figure 2:
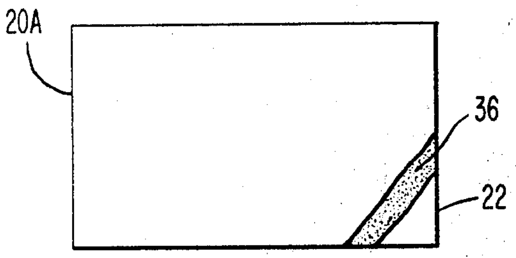
FIGS. 2 through 6 illustrate the mechanical growth of the connector as it is formed by the various steps of the method.
Figure 3:
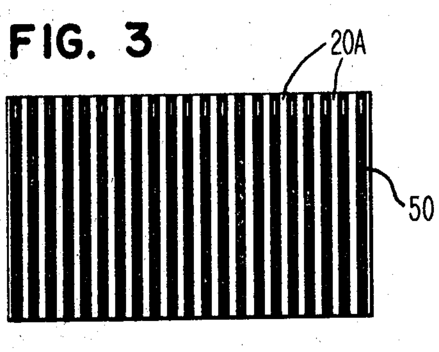
Figure 4:
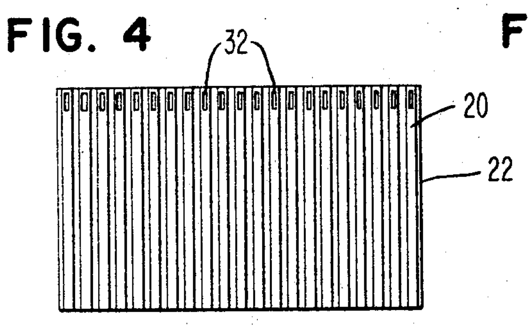
Figure 5:
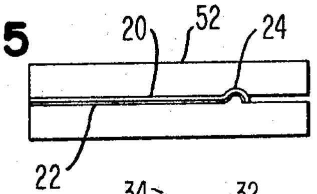

The contacts are arranged on .015" centers to correspond to the spacing of the wires 34 in the memory device. In its use for the purpose of interconnecting wires 34 with associated apparatus, as seen in FIG. 1 the connector is arranged over one side 37 of a frame 38 with the bowed ends 24 extending toward the opposite side 40 and facing upwardly, as illustrated. Then edge 42 of the wire carrier 44 is aligned along the opposite side 40 of the frame member with each of the wire ends resting in one of the grooves 32. An electrically insulating pressure plate 46, shown here as transparent, to facilitate illustration, is then secured over the frame by suitable means, such as screws 48, thus to provide the necessary contact pressure (see FIG. 8) and to prevent inadvertent disconnection of the mating ends. The opposite ends 26 of the connector are left exposed for connection to associated apparatus, as by welding, soldering or wire wrap. As illustrated in FIGS. 2 through 6, the method steps of the invention comprise, bonding a sheet 20A of a suitable spring contact material (.006" beryllium-copper) to a sheet 22 of a suitable flexible insulating material (.002" Mylar polyester film) by means of a suitable adhesive 36 (.001" polyester adhesive) as seen in FIG. 2. The pattern and shape of the contacts is then printed or otherwise applied to the metallic surface with an etchant resist material 50 (FIG. 3), such as Kodak Photo Resist (KPR), and the assembly is etched with a suitable etchant, such as ferric chloride, after which it is washed, leaving the contact fingers extending across the Mylar base from one side to the other (FIG. 4). To shape the bowed ends, the assembly, as seen in FIG. 5, is registered in a simple die 52 and formed. The Mylar is etched away, such as with sulphuric acid, at the locations (opposite ends in this case) where contact freedom is desired (FIG. 6). For best wear resistance and low electrical contact resistance the contacts may be thin plated with nickel and then gold. The grooves 32 are formed simultaneously with the etching by leaving an elongated slot in the resist material 50 where the groove is desired. The smaller width of this hole as compared to the wider spacing between the contact strips retards the etching at this point to permit only enough metal to be etched away to form the groove while all the metal is being etched away between the contact fingers. As a result of the progress of the etching between the fingers, they are formed with the sloping side walls 30, as seen in FIG. 7.

Figure 9:
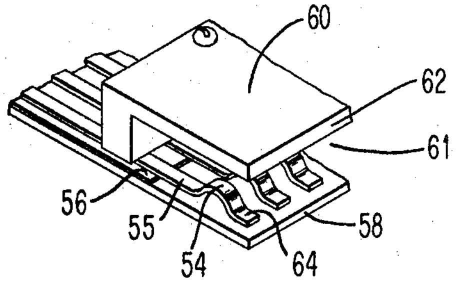
FIGS. 9 through 14 are views illustrating various modifications of the connector.

The method lends itself to the fabrication of many useful modifications of connector design, such as those illustrated in FIGS. 9 through 14. In FIG. 9 the bowed contact portion 54 is formed at a position slightly spaced from the ends of the contact fingers 55, and the substrate 56 is bonded to a rigid base 58. An L-shaped pressure member 60 is secured over the contacts in a manner to form a socket 61 to receive a printed circuit board (not shown) between the overhang 62 and the contact bows 54. Normally the board would be slightly thicker than the space provided for it, so that the contact ends are pressed tightly against mating contacts on the board. The forward extension 64 on the contact ends provide a bearing for the sliding movement of the contact ends as the bow is flattened by insertion of the printed circuit board. An outstanding feature of the invention is the use of the substrate both as a carrier for the contact metal during the process of forming the contacts and in the use of the connector, thus assuring positive alignment of the contact elements at all times.

Figure 10:
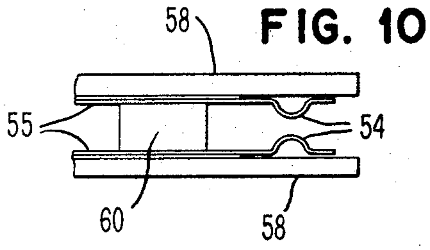

A similar construction is illustrated in FIG. 10 except that the overhang 62 is replaced by another contact assembly whereby a double faced printed circuit board may be accommodated.

Figure 11:
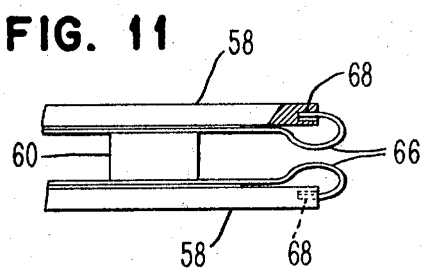

The assembly in FIG. 11 is similar to that of FIG. 10 except that the bows 54 are replaced by the loops 66, the ends of which are turned back and captured in slots 68 provided in the ends of the rigid base members 58.

Figure 12:
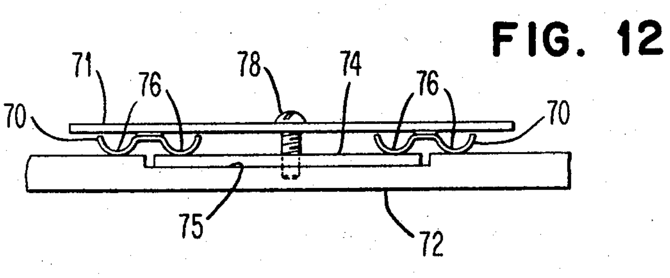

As shown in FIG. 12, a pair of connectors 70 are bonded to a rigid base 71 and employed to interconnect different circuits on a printed circuit board 72 by means of an intermediate patch board 74 positioned in a recess 75 in board 72. In this case both ends of the contact elements of each connector are bowed as at 76 to mate at one end with circuit elements on the printed circuit board 72 and at the other with circuit elements on the patch board 74. A common screw 78 may be used to apply the necessary contact pressure and to secure the base 71 and patch board 74 to the printed circuit board 72.

Figure 13:
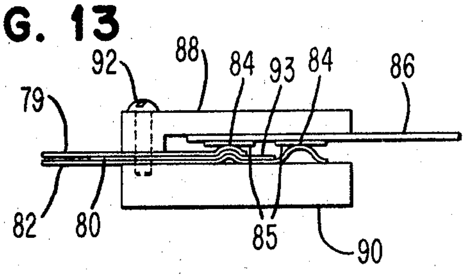

As a further illustration of the versatility of the connector, and as seen in FIG. 13, contact elements may be simultaneously formed on both sides of the flexible Mylar substrate by the method described above. In this case, the upper contact 79 terminates on the substrate 80 to the rear of the lower contact 82. The end bows 84 of each contact faces in the same direction to make contact with different circuit elements 85 on the printed circuit board 86 inserted in the space between the contacts and the L-shaped pressure member 88, all mounted on a rigid base 90 as by screws 92. In this case the Mylar substrate is etched only back to point 93 to prevent shorting between the two contacts.

Figure 14:
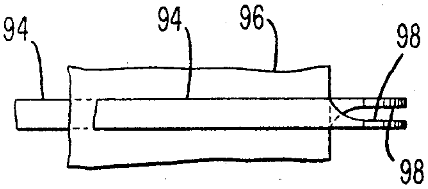

If desired, and as shown in FIG. 14, the contacts 94 on opposite sides of the substrate 96 both may extend equally beyond one edge of the substrate and yet be bowed in the same direction without interfering with each other. This is accomplished by etching away opposite side edges of opposing contacts as indicated at 98. Both contacts 94 are used for making contact with the same side of a printed circuit board, or other device.

Thus, it is seen that the present invention provides an inexpensive connector capable of being mass produced with a broad range of accurately maintained contact spacing and with a wide range of usefulness.

The embodiments of the invention in which an exclusive property or privilege is claimed are defined as follows:

1. The method of fabricating electrical connectors, comprising:
   (A) bonding a thin planar sheet of flexible electrically conductive spring contact metal upon a thin planar sheet of flexible electrically insulating substrate of at least the same size;
   (B) printing a pattern of multiple elongated contact elements upon said metal sheet with an etchant resist material leaving metal exposed between the contacts and further leaving the metal exposed by said printing by rendering elongated four sided slots at the ends of said contact elements;
   (C) etching away the exposed metal down to the substrate while simultaneously etching grooves in the metal exposed by said slots; and
   (D) forming ends of the elongated and grooved contacts out of the original plane of the metal sheet thus to form outstanding pressure contact portions for pressure connection to associated apparatus; and
   (E) etching away the substrate beneath ends of the contacts, leaving the ends extending freely beyond the substrate.

2. The method according to claim 1 wherein steps A and B in claim 1 are modified by:
   (A) providing a metal sheet on both sides of the substrate; and
   (B) printing a contact pattern on both sides whereby the subsequent steps of the method form contacts on opposite sides of the substrate.

3. The method of claim 1 and further including the steps:
   (A) plating end portions of the contacts with a thin coating of nickel, and
   (B) plating a thin coating of gold on top of the nickel.

4. The method of claim 1 wherein:
   (A) the flexible electrically conductive spring contact metal comprises approximately .006″ thick beryllium copper;
   (B) the substrate comprises an approximately .002″ thick sheet of polyester film;
   (C) the bonding material is a .001″ thick polyester adhesive;
   (D) the contacts are on .015″ centers and separated from each other; and
   (E) the etchant for removing the substrate from beneath ends of the formed contacts is sulphuric acid.

References Cited

UNITED STATES PATENTS

| | | | |
|---|---|---|---|
| 3,200,210 | 8/1965 | Alonas et al. | |
| 3,228,093 | 1/1966 | Bratton. | |
| 3,239,639 | 3/1966 | Roback -------- | 174—68.5 XR |
| 3,264,402 | 8/1966 | Shaheen et al. ---- | 29—625 XR |

CHARLIE T. MOON, *Primary Examiner.*

R. CHURCH, *Assistant Examiner.*